A. J. KERCHER.
ELECTRICALLY HEATED COOKER.
APPLICATION FILED JAN. 21, 1911.
1,047,417.
Patented Dec. 17, 1912.
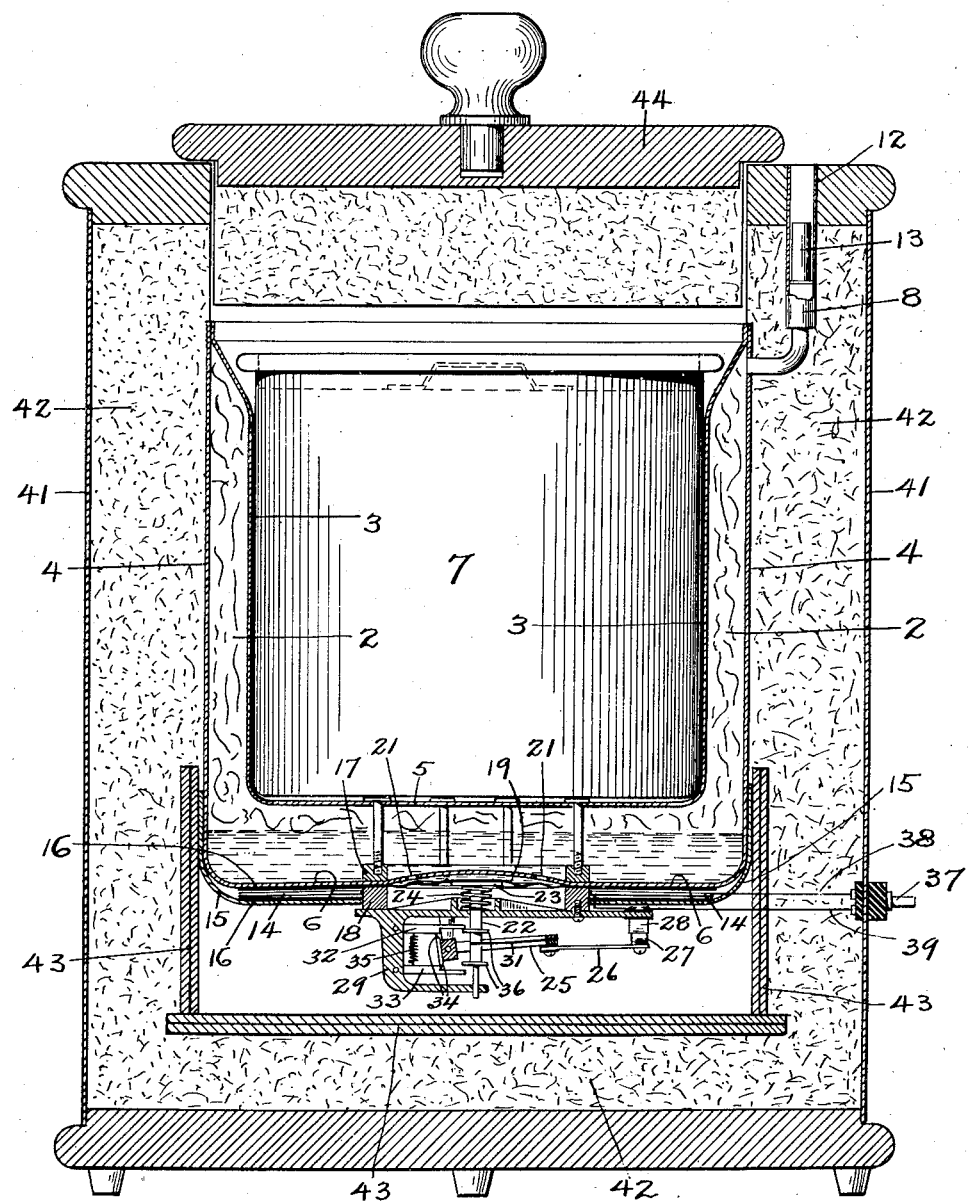
WITNESSES
H. G. Prot.
P. S. Pidwell
INVENTOR
ARTHUR J. KERCHER
By Miller & White
his ATTORNEYS

UNITED STATES PATENT OFFICE.

ARTHUR J. KERCHER, OF BERKELEY, CALIFORNIA, ASSIGNOR, BY DIRECT AND MESNE ASSIGNMENTS, TO BERKELEY ELECTRIC COOKER COMPANY, OF BERKELEY, CALIFORNIA, A CORPORATION OF CALIFORNIA.

ELECTRICALLY-HEATED COOKER.

1,047,417.   Specification of Letters Patent.   Patented Dec. 17, 1912.

Application filed January 21, 1911. Serial No. 603,865.

*To all whom it may concern:*

Be it known that I, ARTHUR J. KERCHER, a citizen of the United States, and a resident of Berkeley, in the county of Alameda and State of California, have invented certain new and useful Improvements in Electrically-Heated Cookers, of which the following is a specification.

The invention relates to cookers which are adapted to be heated to the proper temperature by means of an electric current, and more particularly to a device in which the substance to be cooked and the heating unit are entirely inclosed by a heat insulating material so that all of the heat generated by the heating element is utilized in cooking the substance.

The object of the invention is to provide an electrically heated cooker in which all of the heat generated is utilized in cooking the contained substances.

Another object of the invention is to provide an electrically heated cooker in which the electric current is controlled to maintain a substantially constant temperature within the cooker.

A further object of the invention is to provide an electrically heated cooker in which the electric circuit is made or broken by variations of the temperature within the cooker.

A further object of the invention is to provide an electrically heated cooker having a quick-throw electric switch adapted to be operated by variations of the temperature to either side of a certain critical point.

This device possesses other advantageous features, which, with the foregoing will be set forth at length in the following description where I shall outline in full that form or embodiment of the invention which I have selected for illustration in the drawing accompanying and forming part of the present specification. The novelty of the invention will be included in the claims succeeding said description. From this it will be apparent that I do not restrict myself to the showing made by such drawing and description as I may adopt many variations within the scope of my invention as expressed in said claims.

The figure is a vertical section of the cooker showing the application of the means of controlling the electric circuit.

The heating element is adapted to heat a body of liquid in a closed receptacle from which the heat is transferred to the substance to be cooked and the regulating or controlling means is arranged to be operated by the change in pressure within the receptacle, caused by the change in temperature. It is a well known fact that in a closed receptacle, the pressure varies with the temperature and at a given temperature a certain pressure is obtained. In the present invention I employ this law and arrange the controlling means to operate at a pressure corresponding to the required temperature. By this means the substance to be cooked is subjected to a constant even temperature and is cooked to better advantage than in instances where the temperature fluctuates.

By inclosing the heating element, the receptacle and the material to be cooked with a heat insulating material, all of the heat generated is available to cook the material and a very efficient cooker is obtained.

The current controlling apparatus comprises a quick-throw switch which is operated by changes in the pressure to open or close the electric circuit. The quick-throw switch is advantageous in that it immediately breaks the circuit when the critical pressure is reached, and separates the contacts abruptly, so that no sparking or arcing occurs. The advantage of the quick separation or contacting of the terminals is apparent to those familiar with the use of electric currents and needs no further explanation.

The normally closed receptacle 2 is of an annular construction, having inner and outer side walls 3 and 4 and upper and lower bottom plates 5 and 6. The seat or depression formed by the walls 3 and bottom 5 is adapted to receive the receptacle 7 containing the substances to be cooked. The side walls 3 may be perpendicular, as shown, to accommodate a receptacle 7 having perpendicular sides, or they may be inclined to accommodate receptacles having inclined sides. The size of the receptacle 7 is such that when placed within the cooker it contacts with the sides 3, so that the heat may be transferred from one to the other by conduction.

The relative sizes of the receptacle 2 and the vessels containing the products to be cooked may be varied so that several vessels may be placed in the cooker at one time.

The receptacle 2 contains a quantity of water which is heated and vaporized by the heat generated by the electric currents, thereby transferring the heat by means of the steam to all parts of the receptacle. The level of the water in the receptacle is preferably below the bottom 5, so that a large space is left in which the steam can freely circulate.

An air vent 8 is provided at the upper part of the receptacle to allow the contained air to escape when the electric circuit is first closed. The vent comprises a metallic cylinder 12 having therein a cylinder 13 of some such material as hard rubber. The cylinder 13 is of lesser diameter than the internal diameter of the metallic tube 12 at ordinary atmospheric temperatures and is supported therein by a cross bar or other suitable means. This allows an opening or passage between the tube 12 and the cylinder 13 to allow the air to escape as it is expanded by the heat generated by the electric current. The coefficient of expansion of the rubber being greater than that of the metal, the rubber will expand and close the vent when the escaping air reaches a certain temperature. By providing a hard rubber cylinder of the proper diameter, the vent is closed when the temperature within the receptacle approaches the temperature of boiling point of water and the excess air has been driven off, so that a further heating of the water causes a rise in pressure within the receptacle. The vent 8 is therefore normally closed during the operation of the cooker, or when the temperature within the receptacle is in the vicinity of 212° Fahrenheit.

The heating element 14 is arranged below the bottom 6 and is placed in close relation thereto, so as to be of maximum heating efficiency. The heating element is generally composed of a resistance wire arranged on an annular ring, but may be made in any other well known form. In the drawing, I have shown the element 14 held in place by means of a ring 15 pressed on to the bottom of the receptacle 2, from both of which it is insulated by strips of mica 16.

In the electric circuit I include a quick-throw switch which is operated by changes in pressure within the receptacle 2. Clamped to the bottom 6 of the receptacle 2, by means of the rings 17—18, is a flexible diaphragm 19, preferably formed of metal. That portion of the bottom 6, lying within the rings 17—18 is curved upward, to allow the diaphragm 19 to lie normally in a horizontal position. Apertures 21 in the bottom 6 admit the water to the upper surface of the diaphragm and allow the variation in the pressure within the receptacle 2 to be transferred to the diaphragm.

Bearing against the under side of the diaphragm 19 is a rod 22 having a flat head 23. This rod 22 is held against the diaphragm 19 by the spring 24 and the tension in the spring determines the point at which the pressure in the receptacle will open or close the switch. The movement of the rod 22 operates the mechanism for opening and closing the switch. The bar 25 carries an extension 26 on the outer end of which is a terminal 27. This terminal closes or opens the contact between two terminals 28 (only one being shown in the drawing), so that when the circuit is closed, the current passes from one terminal 28 to the other through terminal 27.

The bar 25 is pivoted near one end to the stationary frame 29, and is moved in and out of contact by means of a flat spring 31, secured to the bar and to the rod 22. When the rod is in the upper position the tension in the spring 31 tends to hold the terminals together, and when the rod is depressed the tension in the spring tends to move the terminals apart. The bar 25 is held from being moved by the spring by means of the fingers 32—33 which engage a projection 34 on the end of the bar. These fingers 32—33 are pivotally attached to the frame 29 and are drawn toward each other by the spring 35.

The movement of the rod 22 causes tension to be put in the spring 31, but the bar is not released until a collar or projection 36 on the rod comes in contact with the finger and moves that finger from contact with the projection 34 on the bar. The bar and the terminal 27 then spring abruptly into the other position.

The heating element is connected to the line connection 37 by the wires 38—39, the wire 39 connecting to one terminal 28 of the switch and from the other terminal to the heating element, so that the circuit is closed only when terminal 27 contacts with terminals 28.

The receptacle 2, the receptacle 7, and the heating element and switch mechanism are inclosed in a receptacle 41 having a thick lining 42 of some heat insulation material so that the heat generated will not become dissipated. The receptacle 41 is open at the top to allow the receptacle 7 to be withdrawn or inserted and a cover 44 provided with a thick coating of heat insulation material is provided to cover the opening.

I prefer to inclose the lower part of the receptacle 2 and the heating element and switch operating device with some heat resisting material 43, such as asbestos, so that the direct heat from the electric current cannot come in contact with the heat insulation material. The outer walls of the inclosing receptacle 41 may be formed of sheet metal, and the top or bottom may be formed of wood, but I do not desire to limit myself to any particular materials of construction.

The switch mechanism will be covered in a separate application and it is believed that the foregoing description is sufficient for this application.

The operation of the device is as follows: I will assume that the receptacle 7 is in place and the water in receptacle 2 is cold. In this condition the pressure in the receptacle 2 is at one atmosphere and the switch is closed. When the circuit is closed through an external switch the water and air in the receptacle become heated. The expanding air escapes through the vent 8 until the temperature thereof is raised to a sufficient degree when the vent is closed. As the temperature in the receptacle 2 is raised, the pressure therein increases and the diaphragm is depressed. When the diaphragm has been depressed a sufficient distance the switch is released and the contact broken. The pressure in receptacle 2 is then gradually reduced until at a certain critical point the switch is again closed and the current again passes through the heating element. The spring bearing against the lower side of the diaphragm is so adjusted that the temperature within the receptacle 2 varies only a few degrees between the opening and closing of the switch.

I claim:

1. An electrically heated cooker comprising a receptacle, a vent on said receptacle adapted to be closed by an increase in temperature within the receptacle, a heating element in close relation to said receptacle, an electric circuit therefor and a quick-throw switch in said circuit.

2. An electrically heated cooker comprising a closed receptacle provided with a normally closed air valve, a heating element in close relation to said receptacle, an electric circuit therefor, a quick throw switch in said circuit adapted to be operated by the variation in the temperature within the closed receptacle, and an envelop of heat insulating material surrounding the receptacle.

3. An electrically heated cooker comprising a receptacle adapted to contain a quantity of liquid, a heating element in close relation to said receptacle, an electric circuit therefor, a quick-throw switch in said circuit adapted to be operated by variations in pressure within said receptacle, an envelop of heat insulating material surrounding the above named elements and a vent on said receptacle adapted to be closed when the water in said receptacle becomes heated.

4. The combination of a casing of heat insulating material, a cover therefor, a receptacle disposed within said casing, a heating element arranged in close relation to said receptacle, electrical connections for said heating element, a quick-throw switch in said connections adapted to be operated by variations in pressure within said receptacle and a vent on said receptacle adapted to be closed by a rise in temperature within said receptacle.

5. The combination of a casing of heat insulating material, a cover therefor, a closed receptacle disposed within said casing, a normally closed air valve on said receptacle, a heat-element in close relation to said receptacle, electrical connections for said heating element, and a quick-throw electric switch arranged in said connections and adapted to open and close the electric circuit by means of variations in pressure within said receptacle.

6. The combination of a casing of heat insulating material, a cover therefor, a closed receptacle adapted to contain a liquid arranged within said casing, a vent for said receptacle adapted to be closed by an increase in temperature within said receptacle, a heating element in close relation to said receptacle, electrical connections therefor, and a quick-throw switch in the electric circuit adapted to be operated by variations in pressure within said receptacle.

7. An electrically heated cooker comprising a closed receptacle adapted to surround the article to be cooked and having a bottom provided with a diaphragm, adapted to be flexed by variations in pressure within the receptacle, a heating element in close relation to said receptacle, an electric circuit therefor and a switch in said circuit adapted to be operated by said diaphragm.

8. An electrically heated cooker comprising a closed receptacle adapted to contain a fluid, a normally closed air valve on said receptacle, a heating element arranged in close relation to said receptacle, an electric circuit therefor, a quick throw switch in said circuit and a diaphragm in the wall of said receptacle, adapted to be flexed by variations in pressure within the receptacle, operatively connected to said switch.

9. An electrically heated cooker comprising a double walled receptacle adapted to contain the articles to be cooked, a vent on said receptacle communicating with the chamber between said walls adapted to be closed by an increase in temperature within the receptacle and a heating unit in close relation to said receptacle.

ARTHUR J. KERCHER.

Witnesses:
H. G. PROST,
P. S. PIDWELL.